United States Patent
Fagerström et al.

(10) Patent No.: US 7,283,852 B2
(45) Date of Patent: Oct. 16, 2007

(54) MOVABLE FUNCTIONAL ELEMENTS FOR MOBILE COMMUNICATION DEVICE

(75) Inventors: Kristian Fagerström, Förby (FI); Ilkka Husgafvel, Helsinki (FI); Vesa Moilanen, Suomusjärvi (FI); Pasi Kemppinen, Tampere (FI)

(73) Assignee: Nokia Corporation, Espoo (FI)

( * ) Notice: Subject to any disclaimer, the term of this patent is extended or adjusted under 35 U.S.C. 154(b) by 373 days.

(21) Appl. No.: 10/659,776

(22) Filed: Sep. 10, 2003

(65) Prior Publication Data

US 2005/0054393 A1    Mar. 10, 2005

(51) Int. Cl.
  *H04M 1/00* (2006.01)
(52) U.S. Cl. ................................. 455/575.1
(58) Field of Classification Search ............. 455/575.1, 455/90.3, 575.4, 575.3, 575.8; D14/316, D14/140, 251
See application file for complete search history.

(56) References Cited

U.S. PATENT DOCUMENTS

| | | | |
|---|---|---|---|
| 5,534,891 A * | 7/1996 | Takano ........................ 345/169 |
| 5,827,082 A | 10/1998 | Laine | |
| 6,175,492 B1 * | 1/2001 | Nobuchi ...................... 361/687 |
| 6,542,354 B1 | 4/2003 | Holtorf et al. | |
| 6,580,932 B1 | 6/2003 | Finke-Anlauff | |
| 6,593,914 B1 | 7/2003 | Nuovo et al. | |
| 6,785,562 B2 * | 8/2004 | Lee et al. .................... 455/566 |
| 6,931,265 B2 * | 8/2005 | Reyes et al. ................ 455/566 |
| 2001/0012196 A1 * | 8/2001 | Zamora et al. ............. 361/683 |
| 2001/0031644 A1 * | 10/2001 | Eromaki ...................... 455/550 |
| 2003/0132863 A1 * | 7/2003 | Lahr ............................ 341/22 |
| 2003/0147205 A1 * | 8/2003 | Murphy ....................... 361/680 |
| 2004/0027335 A1 * | 2/2004 | Lin ............................. 345/168 |
| 2004/0185922 A1 * | 9/2004 | Sutton et al. ............. 455/575.1 |
| 2004/0203513 A1 * | 10/2004 | Kwon ......................... 455/90.3 |
| 2004/0203517 A1 * | 10/2004 | Park et al. ................. 455/90.3 |
| 2004/0203526 A1 * | 10/2004 | Romeu et al. ............. 455/90.3 |
| 2005/0020323 A1 * | 1/2005 | Kim ......................... 455/575.1 |

FOREIGN PATENT DOCUMENTS

| | | |
|---|---|---|
| JP | 05-165548 | 7/1993 |
| JP | 05165548 A * | 7/1993 |
| KR | 2001-0026660 | 4/2001 |
| WO | WO 03/050665 | 6/2003 |
| WO | WO 3050665 A1 * | 6/2003 |

OTHER PUBLICATIONS

Motorola Model V70 GSM Digital Network 1900 MHz, Quick Reference Guide, www.motorola.com, no date listed.

* cited by examiner

*Primary Examiner*—William Trost
*Assistant Examiner*—Marivelisse Santiago-Cordero
(74) *Attorney, Agent, or Firm*—Ware, Fressola, Van der Sluys & Adolphson LLP

(57) ABSTRACT

A moveable functional element such as a keyboard is provided for use with a mobile communication device. The element is constructed in two wing portions. When the cover is swiveled between closed and opened positions, the wing portions move relative to the body of the device and the cover between two positions, a retracted position in which the functional element is hidden and an extended position in which the functional element of the device is exposed for normal use.

26 Claims, 9 Drawing Sheets

MOVABLE FUNCTIONAL ELEMENTS FOR MOBILE COMMUNICATION DEVICE

BACKGROUND OF THE INVENTION

1. Technical Field

The present invention relates generally to mobile communication devices and the like. More particularly, it relates to movable functional elements to create a compact mobile communication device.

2. Description of the Background Art

Mobile telephones and similar communication devices are rapidly expanding in use and function. Such devices are providing Internet access, personal information management and facsimile, messaging in addition to telephone communication. To accomplish this there is a need to provide keyboards compatible with the more complex applications to which the mobile device are now being adapted. Full function keyboards, such as the standard QWERTY typing array of keys and buttons, are difficult to provide while maintaining the compact size required in the mobile device. Such devices on the market today are cumbersome and often require a separate belt pouch for carrying the mobile device on the person of the user. Other functional elements such as displays, cameras, speakers and the like also need to be provided on mobile communication devices in a compact manner.

There are presently a variety of devices commercially available to reveal hidden functional elements such as keypads. However, these devices are generally simple hinge constructions with a pivoting part hinged on a base structure.

SUMMARY OF THE INVENTION

It is an object of the present invention to provide a novel movable functional element such as a keyboard for use with a mobile communication device having a cover which can be moved between closed and opened positions to move the functional element between a retracted position in which the functional element is hidden and an extended position in which the functional element is exposed for normal use.

It is also an object of the present invention to provide a simple and inexpensive means of providing a full function keyboard to accommodate the burgeoning applications to which mobile communication devices are adapted.

It a further object to provide such a device which may be readily and economically fabricated and will enjoy a long life in operation.

It has now been found that a mobile communication device comprising a base element, at least one functional element mounted for reciprocal movement on the base element between retracted and extended positions and a cover element having upper and lower faces. The cover element is mounted to the base element for relative movement thereto between closed and opened positions and adapted to move the at least one functional element between the retracted and extended positions during relative movement of the cover element between the closed and opened positions.

Desirably, the at least one functional element is exposed for operative use in the opened and extended positions and the cover element and the at least one functional element are in overlapping alignment in the closed and retracted positions.

According to the invention, the cover element is a swivelable cover element rotatably mounted on the base element around an axis extending generally perpendicular to the upper and lower faces thereof and generally perpendicular to the reciprocal movement of the at least one functional element. During rotation between the closed and opened positions, the cover element is rotated 90 degrees.

In one embodiment, one of the cover element and the at least one functional element defines at least one eccentric groove and the other of the cover element and the at least one functional element has at least one pin captured in the eccentric groove, whereby mechanical interaction of the at least one pin within the at least one groove during relative movement of the cover element to the base element between the closed and opened positions moves the at least one functional element between the retracted and extended positions. The at least one groove can be defined in the cover element and the at least one pin located on the at least one functional element.

In another embodiment, the at least one functional element is slidably received in at least one channel in the base element for reciprocal movement, whereby the cover element and the at least one functional element mechanically interact during relative movement of the cover element to the base element between the closed and opened positions to move the at least one functional element between the retracted and extended positions. The cover element has at least one roller thereon which engages the at least one functional element during relative movement of the cover element to the base element between the closed and opened positions to move the at least one functional element between the retracted and extended positions. The at least one functional element has at least one tension spring element to bias the at least one functional element against the at least one roller as the at least one functional element is moved between the retracted and extended positions during relative movement of the cover element to the base element between the closed and opened positions. The at least one functional element has at least one groove into which the at least one roller is captured in the opened and extended positions.

In still another feature of the invention, a screen constructed in the upper face of the cover element to provide a visible display of information to the user.

Ideally, the at least one functional element is a function keyboard constructed in two portions, each mounted for reciprocal movement on the base element between retracted and extended positions. Each of the function keyboard portions can have an array of keys consistent with selected functions and the array of keys are offset to prevent interference between the array of keys and the cover element in the closed and retracted positions. The two portions of the function keyboard move away from each other during movement from the retracted position to the extended position and toward each other during movement from the extended position to the retracted position. The two portions are on opposite sides of the cover element in the opened and extended positions. The function keyboard is exposed for operative use in the opened and extended positions and the cover element and the function keyboard are in overlapping alignment in the closed and retracted positions.

Conveniently, the function keyboard comprises a full function QWERTY key array split between the two portions.

As a further feature of the invention, a communication keypad is constructed on the upper face of the cover element and the keypad being exposed for operative use in both the closed and opened positions.

The invention will be fully understood when reference is made to the following detailed description taken in conjunction with the accompanying drawings.

DETAILED DESCRIPTION OF THE INVENTION

Figure 1:
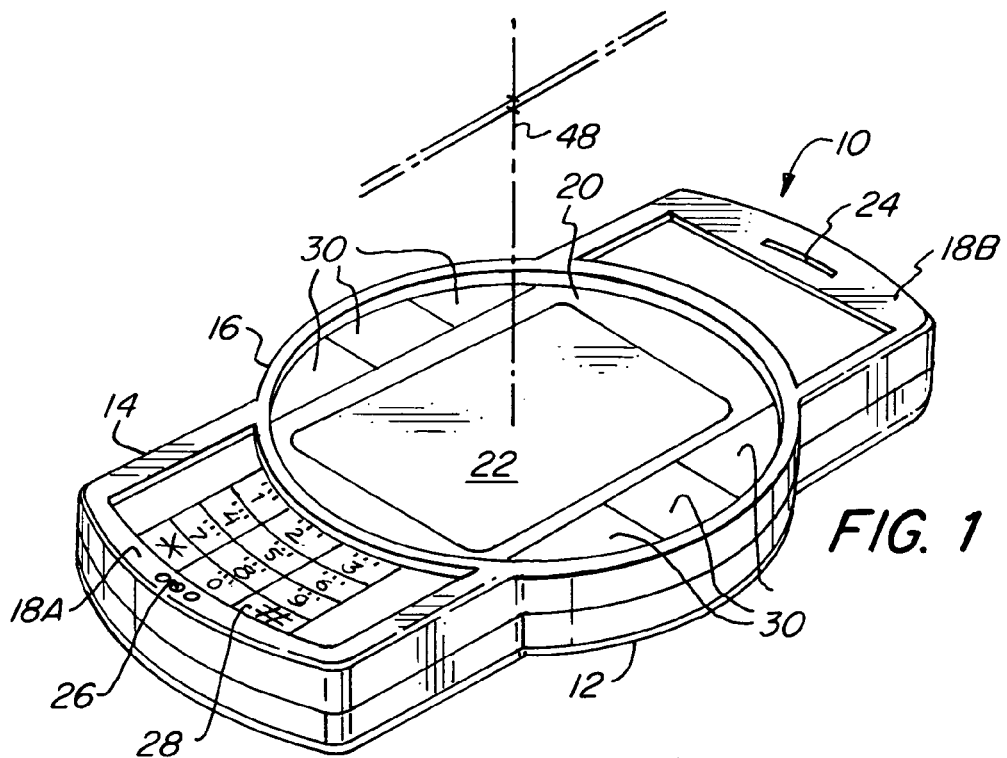
FIG. 1 is a perspective view of the mobile communication device of the present invention in the closed position.

Turning first to FIG. 1 of the drawings, therein illustrated is a mobile communication device generally indicated by the reference numeral 10 and provided with keyboard base 12 having a swivelable cover 14. The swivelable cover 14 includes a circular central portion 16 with two extensions 18A, 18B extending therefrom. For the purpose of illustration, this invention will be described with reference to a mobile telephone, but is applicable to other devices such as pagers, game units and the like.

As shown in FIG. 1, the swivelable cover 14 of the mobile communication device 10 encloses a screen 20 on its circular central portion 16 which provides a display 22 for communicating pertinent information to the user in response to actions by the user and when the mobile communication device 10 is operating strictly in the communication mode. The swivelable cover 14 has a speaker or earphone 24 and a microphone 26 whose operation is well known in the art and will not be described herein. The swivelable cover 14 also has a standard telephone keypad 28 for use when the mobile communication device 10 is operating in a communication mode as a standard operating mobile telephone. Additional input pads 30 can be provided on the swivelable cover 14 for various functional or input features (such as on/off) used in controlling and operating the mobile communication device 10. The mobile communication device 10 can also have other functional elements (e.g. digital camera, battery charging input, headphone input, etc.) mounted on one of the extensions 18A, 18B or the keyboard base 12 as desired. As would be understood by those skilled in the art, all of the electronic components (not shown) and antenna (not shown) for operating the mobile communication device 10 are contained in the swivelable cover 14.

Figure 2:
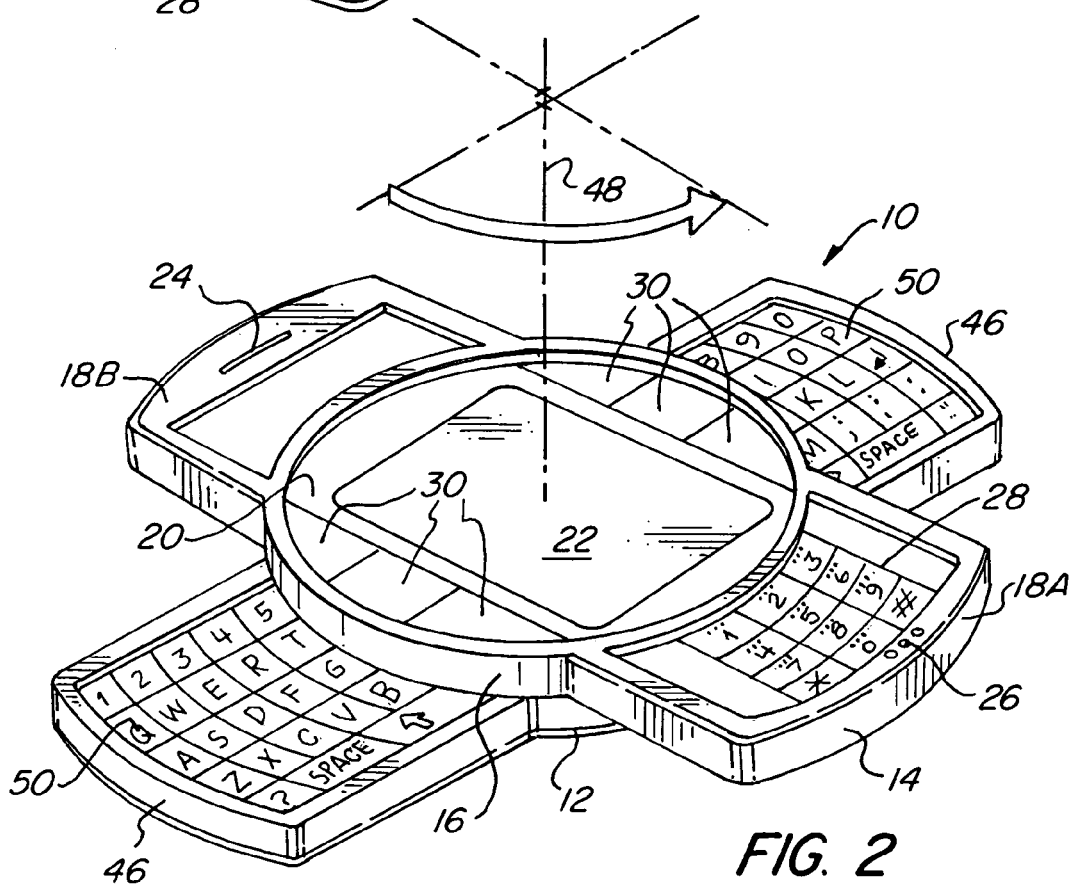
FIG. 2 is a perspective view of the communication device of the present invention in the opened position.
Figure 3:
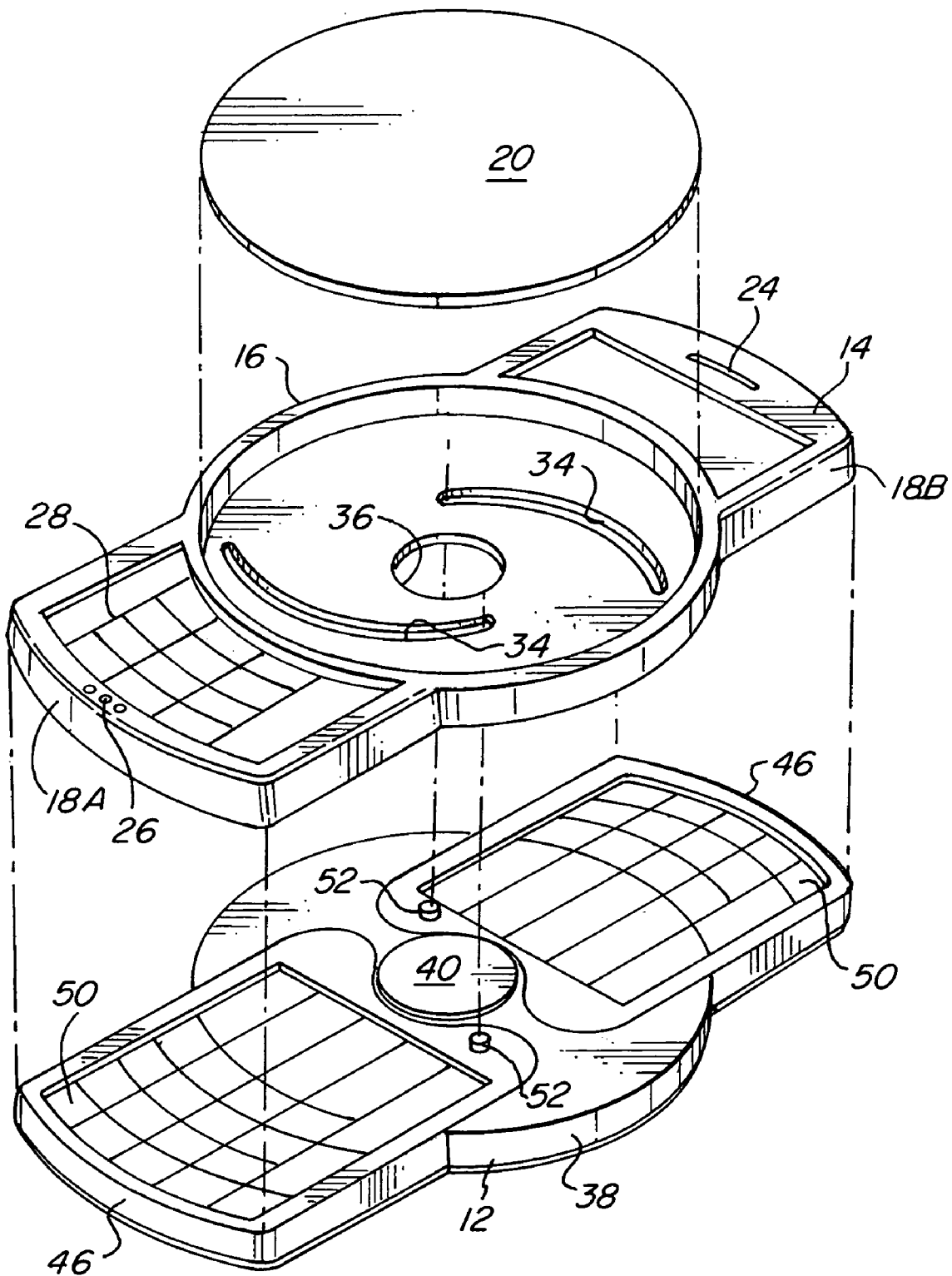
FIG. 3 is a partially exploded perspective view of the communication device of the present invention in the closed position.
Figure 4:
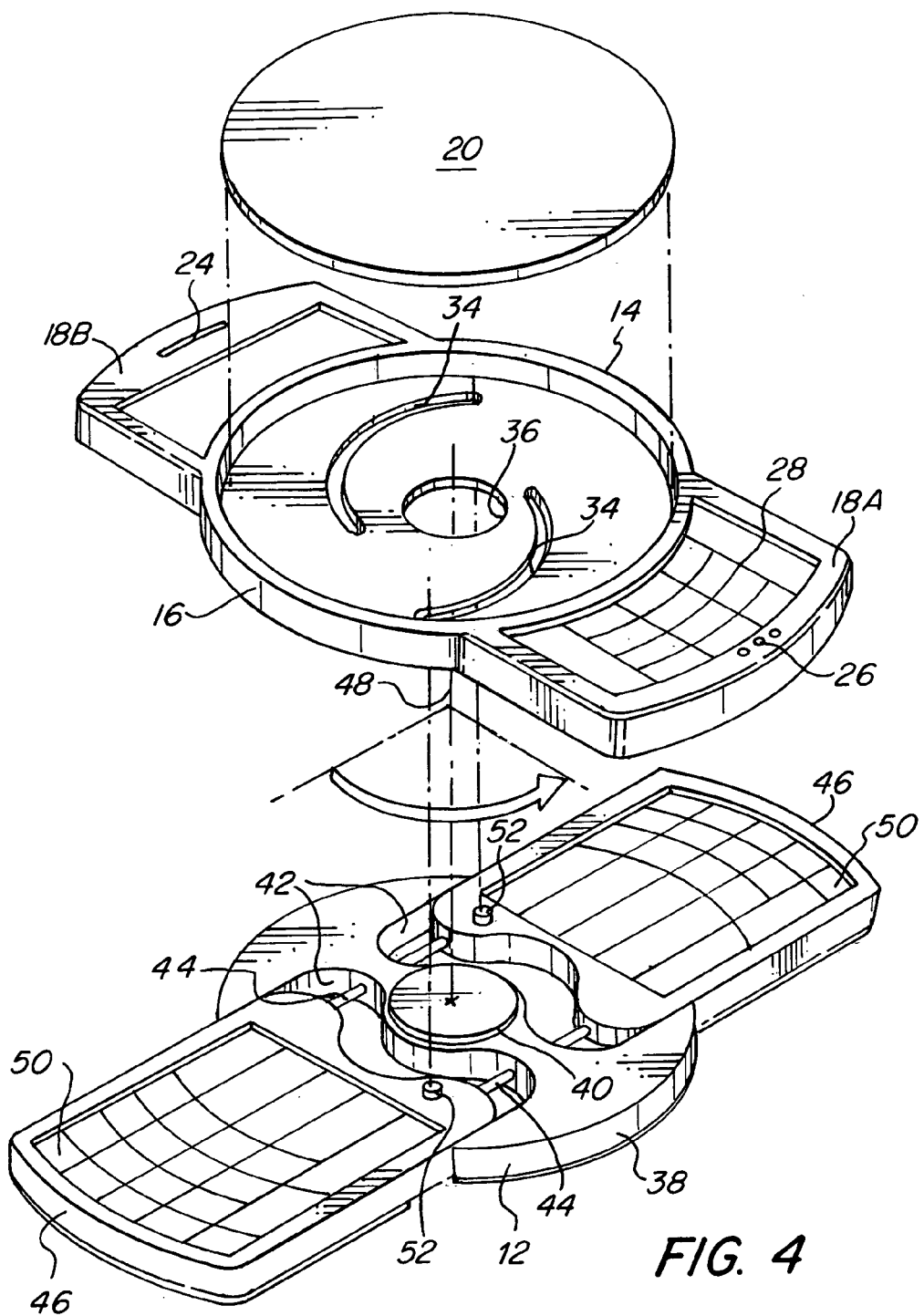
FIG. 4 is a partially exploded perspective view of the communication device of the present invention in the opened position.
Figure 5:
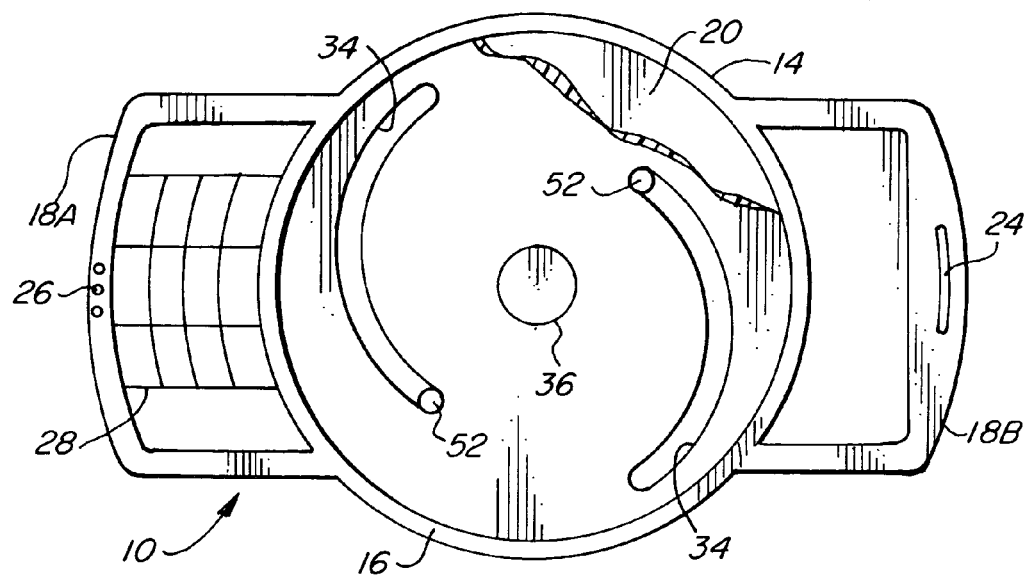
FIG. 5 is a front view of the communication device of the present invention in the closed position with a portion broken away to reveal internal structure.
Figure 6:
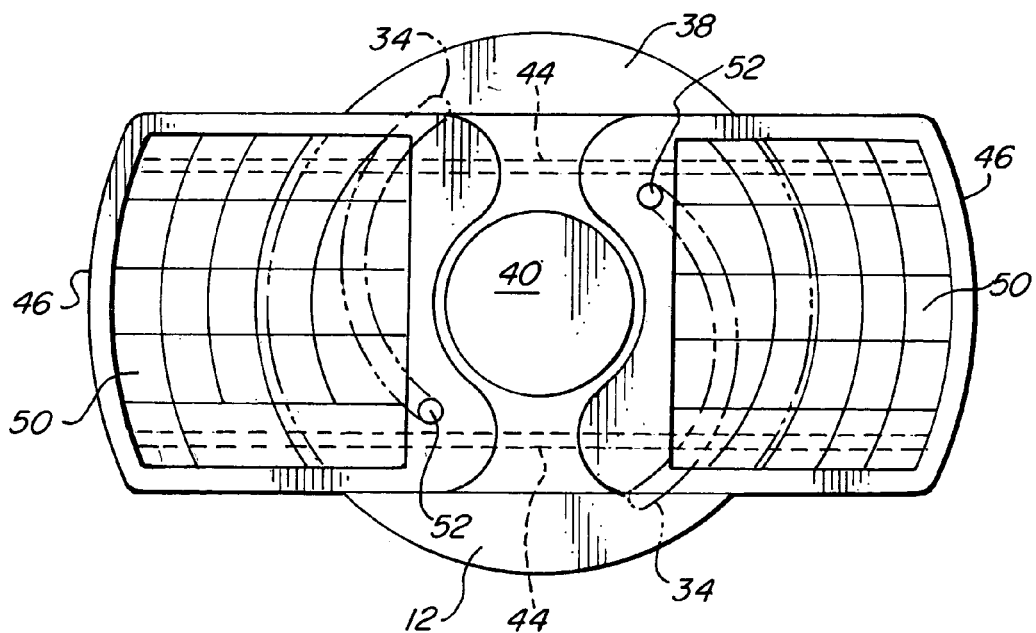
FIG. 6 is a front view of the keyboard base of the communication device of the present invention in the closed position with the cover removed from the keyboard base but showing the eccentric grooves of the cover in phantom line for reference purposes.
Figure 7:
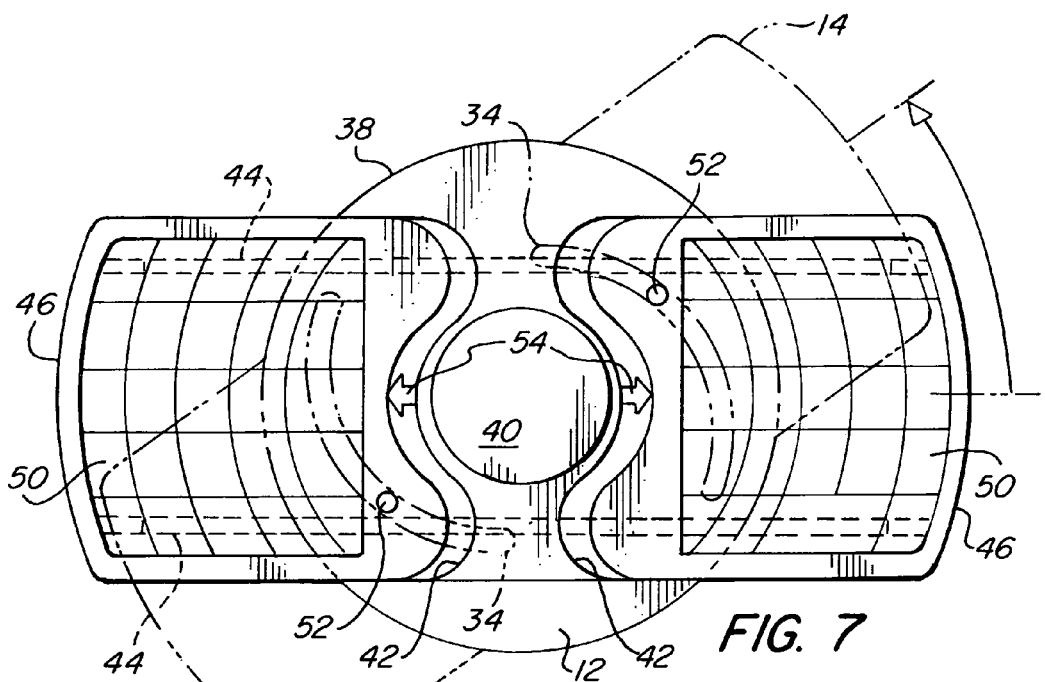
FIG. 7 is a front view of the keyboard base of the communication device of the present invention being moved between the closed and opened positions with the cover in phantom line for reference purposes.

As seen in FIG. 3 and 4, the circular central portion 16 of the swivelable cover 14 has a pair of eccentric grooves 34 and an aperture 36 entirely therethrough underneath the screen 20. As will be explained further hereinafter, the aperture 36 is provided for egress of flexible and/or coaxial cable (not shown) used for power and data communication with the screen 20. The keyboard base 12 has a central circular base portion 38 with a circular disc-shaped protrusion 40 thereon, two opposed recesses 42 on either side thereof and two parallel shafts 44 extending through the central circular base portion 38 and into the recesses 42. Seated in the recesses 42 and slidable received on the shafts 44 are two keyboard wing portions 46 dimensionally sized to move normal to the central axis 48 of the mobile communication device 10. The keyboard wing portions 46 are apertured to be slidingly received on the shafts 44. As can be appreciated from FIG. 2, the keyboard wing portions 46 have an array of input keys 50 arranged in the so-called standard QWERTY layout with half of the keys on each keyboard wing portion 46. A pair of pins 52 are located on the top side of the keyboard wing portions 46 adjacent the innermost portions thereof. The pins 52 are dimensionally sized to be slidably captured in the eccentric grooves 34 of the circular central portion 16. When the swivelable cover 14 is assembled to the keyboard base 12, the pins 52 are slidably captured in the eccentric grooves 34 and the circular protrusion 40 of the central circular base portion 38 extends into a mating recess (not shown) in the swivelable cover 14. The heads of the pins 52 can be enlarged to hold the keyboard base 12 and the swivelable cover 14 in assembly. Alternatively, the keyboard base 12 and the swivelable cover 14 can be held in assembly by attaching the pins 52 to the screen 20. A battery (not shown) can be housed in the keyboard base 12.

Figure 8:
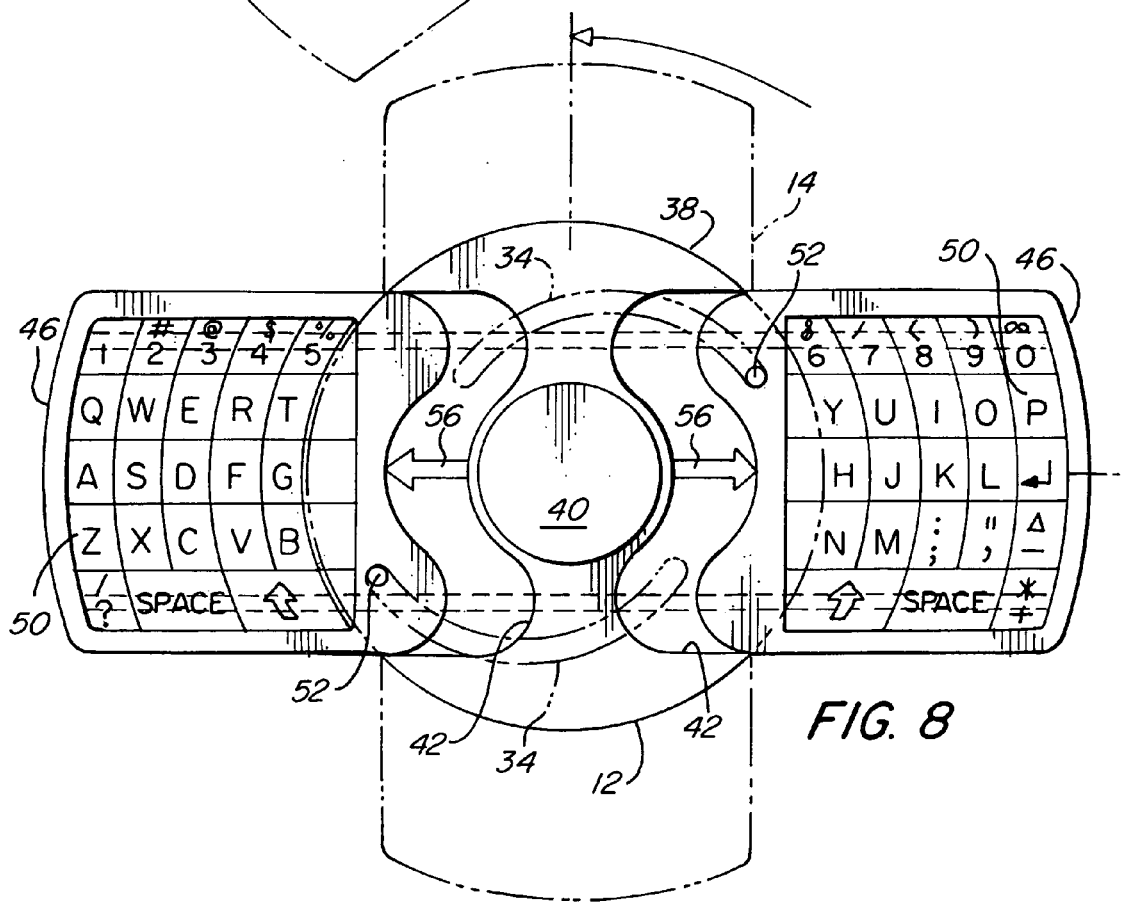
FIG. 8 is a front view of the keyboard base of the communication device of the present invention in the opened position with the cover in phantom line for reference purposes.
Figure 9:
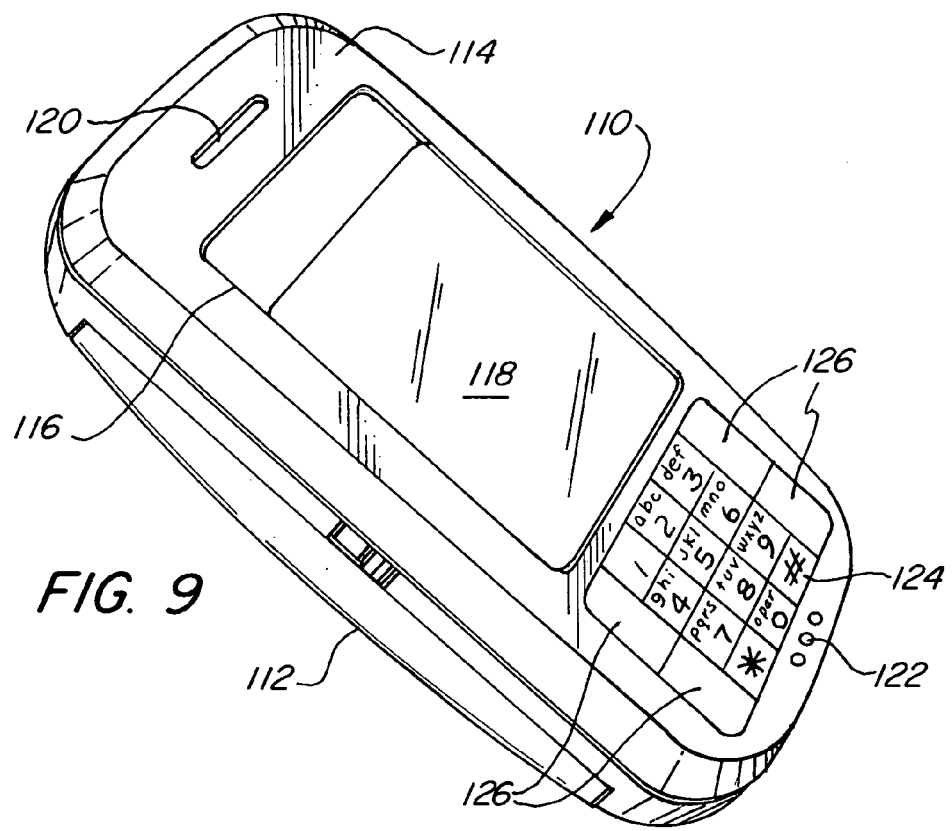
FIG. 9 is a perspective view of another embodiment of the communication device of the present invention in the closed position.

The operation of the mobile communication device 10 to expose the keyboard wing portions 46 will be explained in detail with particular reference to FIGS. 5-8. In the closed position (FIGS. 1 and 5-6) of the mobile communication device 10, the keyboard base 12 is aligned with and covered by the swivelable cover 14 and the keyboard wing portions 46 are in a retracted position. Since the pins 52 are captured in the eccentric grooves 34, counterclockwise rotation of the swivelable cover 14 relative to the keyboard base 12 causes the keyboard wing portions 46 to simultaneously move outwardly along the shafts 44 as indicated by arrows 54, 56 in FIGS. 7-8 as the pins 52 move along the eccentric grooves 34. As seen in FIGS. 2 and 8, when the swivelable cover 14 has been rotated ninety degrees (90°) to its opened position, the pins 52 reach the end of the eccentric grooves 34 and the keyboard wing portions 46 are in an extended position revealing the QWERTY input key arrays 50 separated by the screen 20. While in the opened position, the display 22 is aligned with the input key arrays 50 and the keypad 28. Thus, a full function keyboard is provided to the user to accommodate the burgeoning application to which the mobile communication device 10 can be adapted. Clockwise rotation of the swivelable cover 14 from the opened position to the closed position returns the keyboard wing portions 46 to the retracted position.

In FIGS. 9-15, therein is illustrated a modified embodiment of the mobile communication device generally indicated by the reference numeral 110. The mobile communication device 110 has a keyboard base 112 with a swivelable cover 114. The swivelable cover 114 of the mobile communication device 110 encloses a screen 116 which provides a display 118 for communicating pertinent information to the user in response to actions by the user and when the mobile communication device 110 is operating strictly in the communication mode. The swivelable cover 114 has a speaker or earphone 120 and a microphone 122 whose operation is well known in the art and will not be described herein. The swivelable cover 114 also has a standard telephone keypad 124 for use when the mobile communication device 110 is operating in a communication mode as a standard operating mobile telephone. Additional input pads 126 can be provided for various functional or input features (such as on/off) used in controlling and operating the mobile communication device 110. As would be understood by those skilled in the art, all of the electronic components (not shown) and antenna (not shown) for operating the mobile communication device 110 are contained in the swivelable cover 114. A battery (not shown) can be housed in the keyboard base 112.

Figure 11:
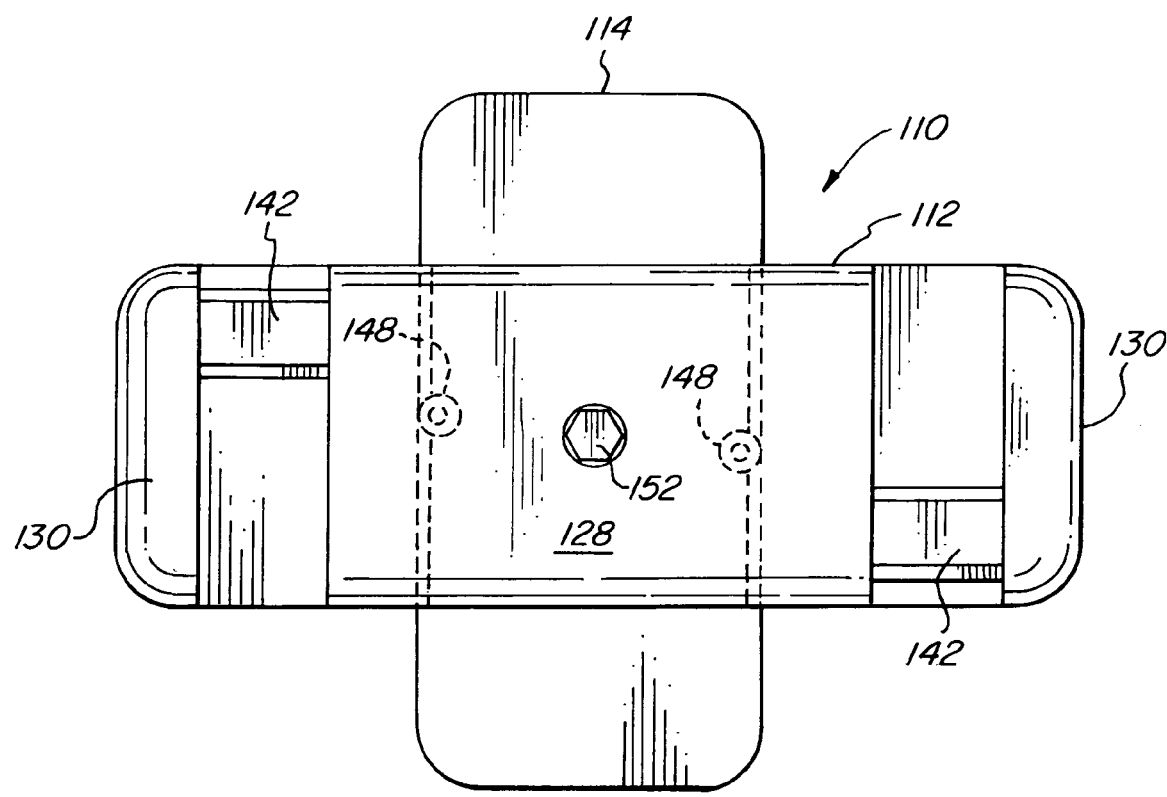
FIG. 11 is a back view of the FIG. 9 embodiment of the communication device of the present invention in the opened position.
Figure 12:
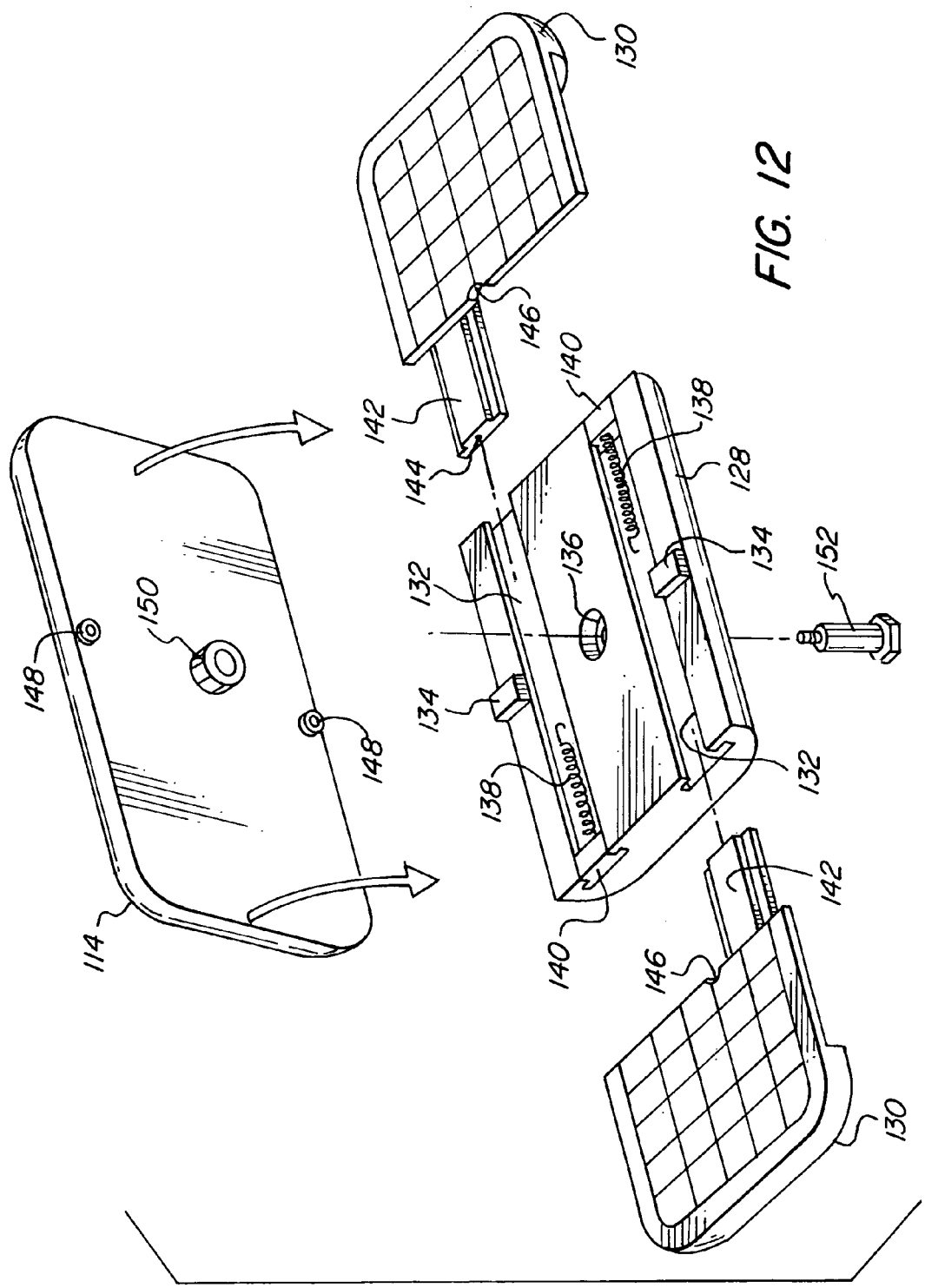
FIG. 12 is an exploded perspective view of the FIG. 9 embodiment of the communication device of the present invention.

As shown in FIGS. 11 and 12, the keyboard base 112 comprises a central base portion 128 and two keyboard wing portions 130. The central base portion 128 has two parallel channels 132 in an upper side thereof, two stop blocks 134 adjacent the channels 132 and a central aperture 136 therebetween. Located in the channels 132 are tension springs 138 which are connected at one end to spring anchors 140 secured in the channels 132.

Each keyboard wing portion 130 has a leg extension 142 dimensionally sized to be slidingly received into one of the channels 132. The leg extensions 142 have apertures 144 (only one shown in FIG. 12) securing the end of the tension springs 138 whereby the leg extensions 142 are biased by the tension springs 138 into abutting relationship with the stop blocks 134 (see FIG. 14) in the closed and retracted positions of the mobile communication device 110. The keyboard wing portions 130 also have small grooves 146 therein whose function and purpose will be more fully understood hereinafter.

Located on the back side of the swivelable cover 114 are a pair of offset rollers 148 and a central threaded nut 150. A bolt 152 extends through the central aperture 136 of the keyboard base 112 and into the central threaded nut 150 to hold the keyboard base 112 and the swivelable cover 114 in rotatable assembly.

Figure 10:
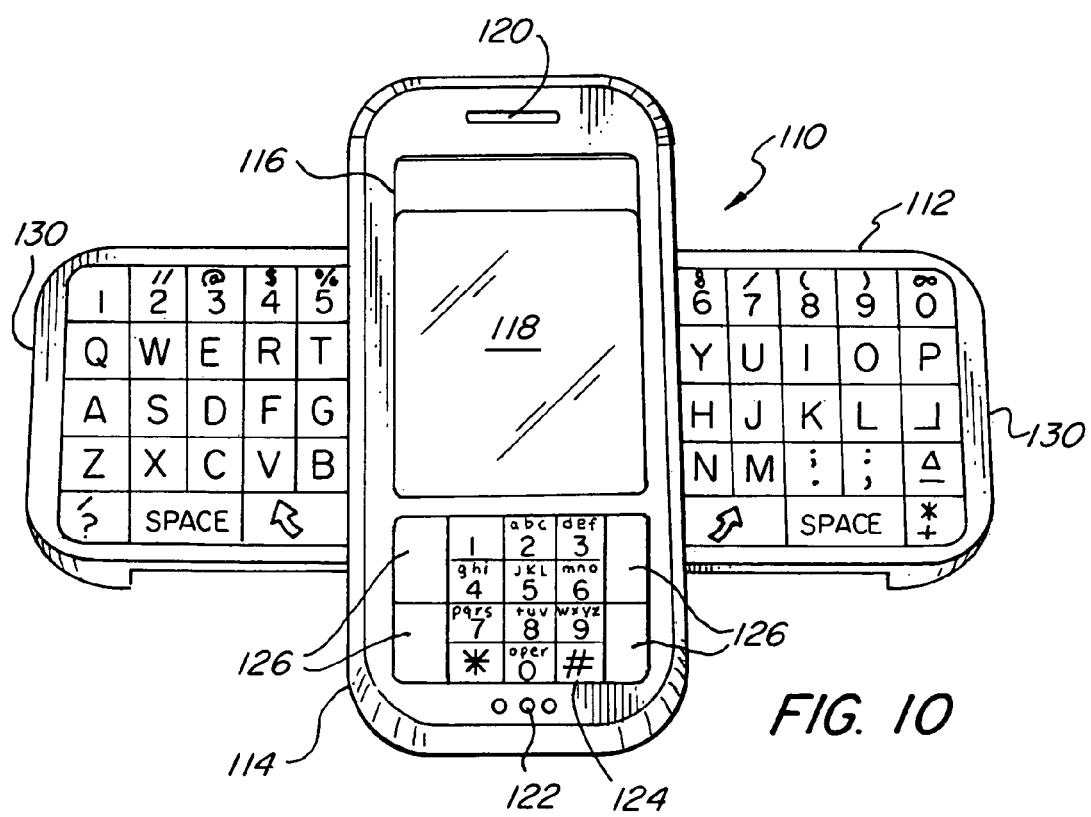
FIG. 10 is a perspective view of the FIG. 9 embodiment of the communication device of the present invention in the opened position.
Figure 13:
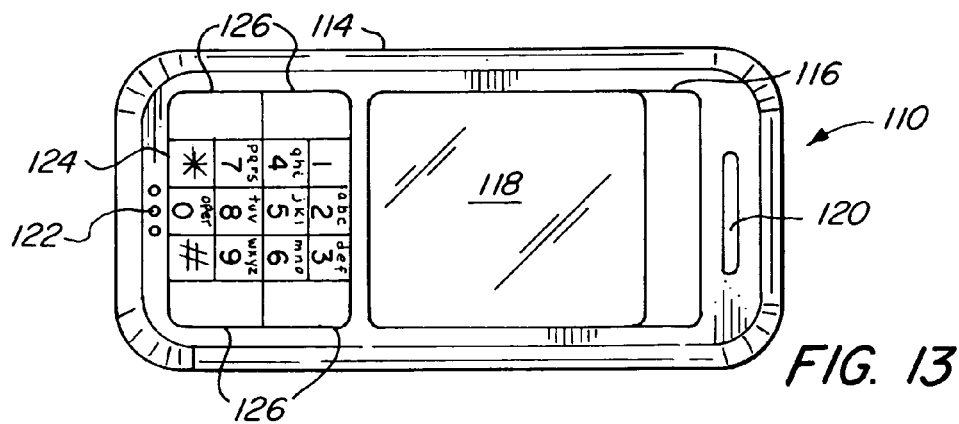
FIG. 13 is a front view of the FIG. 9 embodiment of the communication device of the present invention in the closed position.
Figure 14:
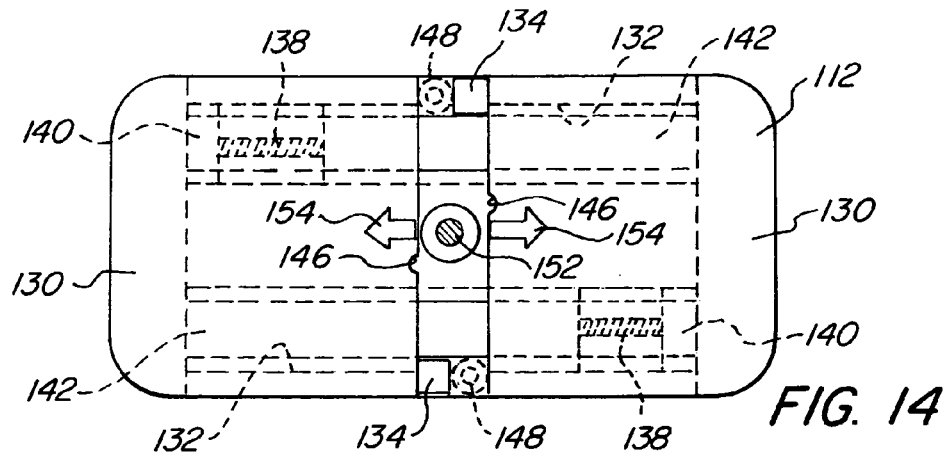
FIG. 14 is a front view of the FIG. 9 embodiment of the communication device of the present invention in the closed position with portions of the internal structure in dotted line and the cover in phantom line for reference purposes.
Figure 15:
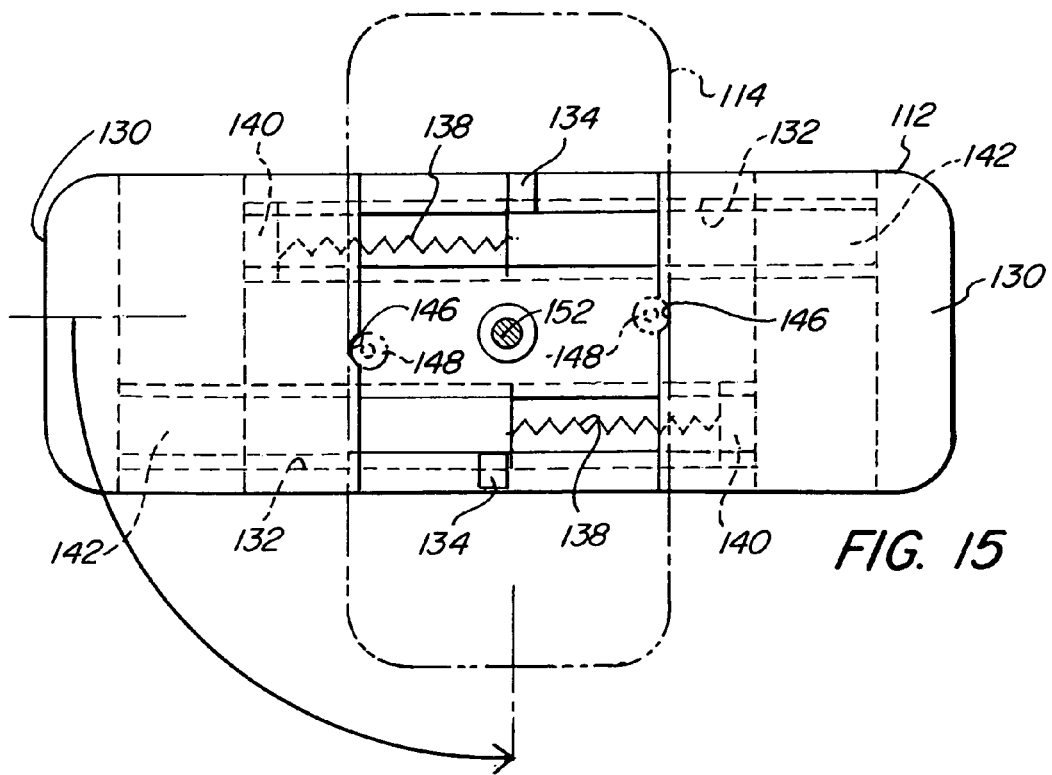
FIG. 15 is a front view of the FIG. 9 embodiment of the communication device of the present invention moved to the opened position with portions of the internal structure in dotted line and the cover in phantom line for reference purposes.

Operation of the modified embodiment of the mobile communication device 110 can be best understood when viewing FIGS. 13-15. With the mobile communication device 110 in its closed position as shown in FIGS. 13-14, the tension springs 138 bias the keyboard wing portions 130 to a retracted position against the stop blocks 134 sandwiching the rollers 148 between the keyboard wing portions 130 and the stop blocks 134. In these closed and retracted positions, the keyboard base 112 is aligned with and covered by the swivelable cover 114. Counterclockwise rotation (as viewed in FIGS. 14-15) of the swivelable cover 114 relative to the keyboard base 112 causes the keyboard wing portions 130 to simultaneously move outwardly as indicated by arrows 154 in FIG. 14 as the rollers 148 move along the abutting edges of the keyboard wing portions 130. As seen in FIG. 10, when the swivelable cover 114 has been rotated ninety degrees (90°) to its opened position, the rollers 148 seat in the grooves 146 of the keyboard wing portions 130 and the keyboard wing portions 130 reach an extended position revealing the QWERTY keyboard array separated by the screen 116. The tension springs 138 help maintain the rollers 148 in the grooves 146. Clockwise rotation of the swivelable cover 114 to its closed position reverses the operation of the keyboard wing portions 130 returning them to the retracted position and being assisted by the action of the tension springs 138.

As would be appreciated by those skilled in the art, all electrical connections between the keyboard wing portions (46, 130) and the battery to the electronic components and the screen (20, 116) in the swivelable cover (14, 114) are by flexible cables and/or coaxial cables (not shown). The keyboard wing portions (46, 130) can be connected directly via flexible cables and/or coaxial cables to the electronic components and the screen (20, 116) in the swivelable cover (14, 114) or the keyboard wing portions (46, 130) can be connected to the battery which is in turn connected via flexible and/or coaxial cables to the electronic components and the screen (20, 116) in the swivelable cover (14, 114). Well known winding and reeled flexible cables extending through the center (e.g. through aperture 36) of the mobile communication device (10, 110) can be used. The keyboard wing portions (46, 130) can have serial interface circuits (not shown) which can be powered by the battery and communicate data through a flexible and/or coaxial cable to the electronic components and the screen (20, 116) in the swivelable cover (14, 114).

In this manner, a simple and compact keyboard is provided in operative association with a mobile communications device. It should be noted that other key arrays can be used such as the French AZERTY or the German QWERTZ (U).

Although explained in relation to a movable keyboard, the device of the present invention could be designed to reveal other functional elements such as displays, cameras, speakers and the like useful with a mobile communication device.

Thus, it can be seen from the foregoing specification and attached drawings that the mobile communication device provides a moveable functional element such as a keyboard. With the element constructed in two wing portions, the cover can be swiveled between closed and opened positions so the wing portions move relative to the body and cover of the device between two positions, one in which the functional element is hidden and another in which the functional element of the device is exposed for normal use.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

In the claims:

1. A mobile communication device comprising:
   (a) a base element;
   (b) at least one functional element mounted for reciprocal movement on said base element between retracted and extended positions, said at least one functional element is a function keyboard, said function keyboard is constructed in two portions, each mounted for reciprocal movement on said base element between retracted and extended positions, each of said function keyboard portions having an array of keys consistent with a selected function, said two portions of said function keyboard move away from each other during movement from the retracted position to the extended position and toward each other during movement from the extended position to the retracted position; and
   (c) a cover element having upper and lower faces, said cover element mounted to said base element for relative movement thereto between closed and opened positions and said cover element and said at least one functional element are interactively connected for moving said at least one functional element relative to said base element between the retracted and extended positions during relative movement of said cover element between the closed and opened positions.

2. A mobile communication device in accordance with claim 1, wherein said at least one functional element is configured to be exposed for operative use in the opened and extended positions and said cover element and said at least one functional element are configured to be in overlapping alignment in the closed and retracted positions.

3. A mobile communication device in accordance with claim 1, wherein said cover element is a swivelable cover element rotatably mounted on said base element.

4. A mobile communication device in accordance with claim 3, wherein said swivelable cover element is rotatably mounted on said base element around an axis extending generally perpendicular to said upper and lower faces thereof.

5. A mobile communication device in accordance with claim 3, wherein said swivelable cover element is rotatably mounted on said base element around an axis extending generally perpendicular to the reciprocal movement of said at least one functional element.

6. A mobile communication device in accordance with claim 5, wherein said cover element is configured to rotate 90 degrees between the closed and opened positions.

7. A mobile communication device in accordance with claim 1, wherein said cover element is configured to rotate 90 degrees between the closed and opened positions.

8. A mobile communication device in accordance with claim 1, wherein one of said cover element and said at least one functional element defines at least one eccentric groove and the other of said cover element and said at least one functional element has at least one pin captured in the eccentric groove, whereby mechanical interaction of said at least one pin within said at least one groove during relative movement of said cover element to said base element between the closed and opened positions moves said at least one functional element relative to said base element between the retracted and extended positions.

9. A mobile communication device in accordance with claim 8, wherein said at least one groove is defined in said cover element and said at least one pin is located on said at least one functional element.

10. A mobile communication device in accordance with claim 1, wherein said at least one functional element is slidably received in at least one channel in said base element for reciprocal movement, whereby said cover element and said at least one functional element mechanically interact during relative movement of said cover element to said base element between the closed and opened positions to move said at least one functional element relative to said base element between the retracted and extended positions.

11. A mobile communication device in accordance with claim 10, wherein said at least one functional element has at least one tension spring element to bias said at least one functional element against said cover element as said at least one functional element is moved relative to said base element between the retracted and extended positions during relative movement of said cover element to said base element between the closed and opened positions.

12. A mobile communication device in accordance with claim 1, wherein said at least one functional element has at least one tension spring element to bias said at least one functional element against said cover element as said at least one functional element is moved relative to said base element between the retracted and extended positions during relative movement of said cover element to said base element between the closed and opened positions.

13. A mobile communication device in accordance with claim 1, further including a screen constructed in the upper face of said cover element to provide a visible display of information to the user.

14. A mobile communication device in accordance with claim 1, wherein said two portions are on opposite sides of said cover element in the opened and extended positions.

15. A mobile communication device in accordance with claim 1, wherein said function keyboard comprises a full function QWERTY key array split in first and second portions.

16. A mobile communication device in accordance with claim 1, wherein said function keyboard has an array of keys consistent with selected functions, said array of keys are offset to prevent interference between said array of keys and said cover element in the closed and retracted positions.

17. A mobile communication device in accordance with claim 1, further comprising a communication keypad constructed on said upper face of said cover element, said keypad being exposed for operative use in the closed position.

18. A mobile communication device in accordance with claim 1, wherein said at least one functional element is slidably received in at least one channel in said base element for relative reciprocal movement therebetween.

19. A mobile communication device in accordance with claim 1, wherein said cover element and said at least one functional element are interactively connected by interaction of at least one eccentric groove with a pin follower therein for moving said at least one functional element relative to said base element between the retracted and extended positions during relative movement of said cover element to said base element between the closed and opened positions.

20. A mobile communication device in accordance with claim 1, wherein said cover element and said at least one functional element are interactively connected so that a portion of said cover element engages said at least one functional element during relative movement of said cover element to said base element between the closed and opened positions to move said at least one functional element relative to said base element between the retracted and extended positions.

21. A mobile communication device in accordance with claim 1, wherein said interactive connection between said cover element and said at least one functional element is a mechanical connection to move said at least one functional element relative to said base element between the retracted and extended positions during relative movement of said cover element between the closed and open positions.

22. A mobile communication device in accordance with claim 21, wherein said cover element is configured to rotate through an angle of at least 90 degrees between the closed and open positions.

23. A mobile communication device comprising:
(a) a base element;
(b) at least one functional element mounted for reciprocal movement on said base element between retracted and extended positions, said at least one functional element is slidable received in at least one channel in said base element for reciprocal movement; and
(c) a cover element having upper and lower faces, said cover element mounted to said base element for relative movement thereto between closed and opened positions and adapted to move said at least one functional element between the retracted and extended positions during relative movement of said cover element between the closed and opened positions, said cover element has at least one roller thereon which engages said at least one functional element during relative movement of said cover element to said base element between the closed and opened positions to move said at least one functional element between the retracted and extended positions, whereby said cover element and said at least one functional element mechanically interact during relative movement of said cover element to said base element between the closed and opened positions to move said at least one functional element between the retracted and extended positions.

24. A mobile communication device in accordance with claim 23, wherein said at least one functional element has at least one tension spring element to bias said at least one functional element against said at least one roller as said at least one functional element is moved between the retracted and extended positions during relative movement of said cover element to said base element between the closed and opened positions.

25. A mobile communication device in accordance with claim 24, wherein said at least one functional element has at least one groove into which said at least one roller is captured in the opened and extended positions.

26. A mobile communication device in accordance with claim 23, wherein said at least one functional element has at least one groove into which said at least one roller is captured in the opened and extended positions.

* * * * *